United States Patent Office 3,057,877
Patented Oct. 9, 1962

3,057,877
PROCESS FOR PRODUCING 2-(1,1-DIMETHYL-2-HYDROXY-ETHYL)-5,5-DIMETHYL-1,3-DIOXANE
Howard C. Klein, Brooklyn, N.Y., assignor to Nopco Chemical Company, Harrison, N.J., a corporation of New Jersey
No Drawing. Filed Nov. 6, 1959, Ser. No. 851,224
4 Claims. (Cl. 260—340.7)

In my co-pending application, Serial No. 711,814, filed January 29, 1958, the isolation in an organic solvent phase of an unknown by-product which is formed during the preparation of alpha-hydroxy-$\beta\beta$-dimethyl-gamma-butyrolactone, hereinafter referred for convenience as pantoyl lactone, is mentioned. Qualitative experimentation carried out in connection with this organic solvent solution showed that complete evaporation of the solvent, followed by warm water washes of the oily residue yielded a water-insoluble amber colored oil, which spontaneously crystallized overnight at room temperature. The water-immiscible residue was found to be soluble in most organic solvents, including hydrocarbon solvents. Crystallization of the product was effected from hexane or diethyl ether at a temperature of about 5° C. to obtain long, white needles, having a melting point of 66.5° C. to 67.0° C. By a hydroxyl determination, the product was calculated to have a molecular weight of about 195, assuming the acetylation of a single hydroxyl group by the method of acetylation employed. Preparation of the p-nitrobenzoate derivative yielded a product having a melting point of 122 to 123° C., and a molecular weight as determined by a saponification method of 339. This again indicates a molecular weight of about 195 for the parent compound. A Kjeldahl determination showed the absence of nitrogen in the parent compound; a carbon and hydrogen analysis gave C=63.45; H=11.14. When the parent compound was refluxed with a alcoholic-potassium hydroxide, no alkali was consumed, indicating the absence of a lactone, or ester function in the molecule. Furthermore, this compound did not respond to a test for unsaturation with bromine in carbon tetrachloride. Tests for the presence of an aldehyde or ketone function were also negative.

I have been successful in identifying the chemical character of the said product thus described in my co-pending U.S. patent application, Serial No. 711,814, filed January 29, 1958. This compound is 2-(1,1-dimethyl-2-hydroxy-ethyl)-5,5-dimethyl-1,3-dioxane having the formula

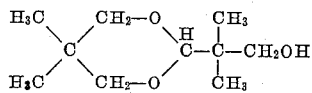

It is to be noted that this compound is extremely resistant to hydrolysis; however, this compound can be hydrolyzed under vigorous hydrolysis conditions. This compound is useful as an intermediate in the production of 2,2-dimethyl-1,3-propanediol, or as it is commonly called, neopentyl glycol, which in turn is used in the production of plasticizers. The neopentyl glycol is obtained from 2-(1,1-dimethyl-2-hydroxy-ethyl)-5,5-dimethyl-1,3-dioxane by cleaving with concentrated hydrochloric acid for 16 hours with reflux conditions, after which the reaction mass is neutralized with a suitable base. When the neopentyl glycol is reacted with mono basic acids, such as, 2-ethylhexoic acid or pelargonic acid, the plasticizers produced are especially useful in imparting low temperature flexibility to vinyl films. The structural formula for neopentyl glycol is:

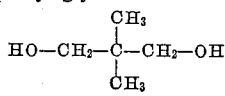

The object of the invention accordingly is to provide a method for obtaining a cyclic acetal product, specifically 2-(1,1-dimethyl-2-hydroxy-ethyl)-5,5-dimethyl-1,3-dioxane, which prior to this time has been undetected in the pantoyl lactone synthesis.

It is a further object of this invention to provide a method for separating a cyclic acetal product, specifically 2-(1,1-dimethyl-2-hydroxy-ethyl)-5,5-dimethyl-1,3-dioxane, from a crude pantoyl lactone product.

It has been found that when a dilute alkali solution is mixed with a crude alpha-hydroxy-$\beta\beta$-dimethyl-gamma-butyrolactone, which has been previously dissolved in a suitable organic solvent, a two phase system results, i. e., an aqueous phase and an organic solvent phase. The alpha-hydroxy-$\beta\beta$-dimethyl-gamma-butyrolactone is dissolved in the organic solvent phase of the two phase aqueous-organic solvent system, and 2-(1,1-dimethyl-2-hydroxyethyl)-5,5-dimethyl-1,3-dioxane, will be found present in an extractable form, and easily removed from the organic solvent phase of the system.

In the preferred embodiment of the invention, the crude pantoyl lactone material is first treated with an alkali after the lactonization step has been completed as described in 711,814 to adjust it to a pH with the range of about 6.5 to 6.8. This adjustment is for neutralization purposes. In general, any alkali can be employed. Suitable alkalies which can be used, are for example, sodium hydroxide, potassium hydroxide, potassium carbonate, sodium carbonate, sodium bicarbonate, potassium bicarbonate, aqueous ammonia, etc. However, aqueous ammonia is preferably employed. Thereafter, a water-immiscible organic solvent in which the lactone is soluble is added to the aqueous pantoyl lactone solution. In the preferred embodiment of the invention, the water-immiscible organic solvent phase of the system, which contains the lactone is then separated from the aqueous phase. The pantoyl lactone is thereby extracted from the aqueous phase which contains impurities made water-soluble due to the preceding neutralization. The aqueous solution is then separated from the organic solution of the process and can be discarded.

Any water-immiscible solvent in which pantoyl lactone is soluble can be employed in the practice of this invention. Thus, for example, organic solvents such as methylene chloride, ethylene dichloride, isopropyl acetate, chloroform, benzene, etc., can be used. The quantity of solvent employed is not critical, however, it should be in sufficient amount to extract the crude pantoyl lactone completely. Generally, several extractions will be carried out. In each instance, about one volume of organic solvent for each 3 or 4 volumes of the aqueous pantoyl lactone solution is used. Thereafter, the several organic solvent extractions are combined into a single solution. It is this solution which is used in the next step of the process, that is, the saponification step.

In this saponification step the pantoyl lactone which is contained in the organic solvent is treated with a dilute aqueous solution of salt-forming alkali. This treatment is carried out whether the pantoyl lactone organic solvent solution has or has not been separated from the aqueous phase.

The water-soluble lactone salt thus produced is taken up in the aqueous phase of the two phase system. Any alkali which reacts with pantoyl lactone, and which forms a water-soluble salt thereof can be employed, for example, sodium hydroxide, potassium hydroxide, sodium carbonate, potassium carbonate, sodium bicarbonate, potassium bicarbonate, and mixtures thereof.

In the preferred embodiment of the invention, sodium hydroxide is used as the salt-forming alkali. The preliminary neutralization of the crude aqueous pantoyl lactone is a preferred step of the process. However, if the preliminary neutralization step is omitted, a sufficient quantity of alkali must be employed in the saponification step not only to form a salt with the pantoyl lactone, but also to neutralize other acid residues present in the crude lactone solution. An excess of alkali is preferably employed. The saponification reaction is exothermic, and will proceed to completion without the application of external heat. The saponification step can be commenced at temperatures of about room temperature or higher. However, the reaction will proceed to completion at much lower temperatures. The temperature employed can be as low as about 0° C. The saponification step is preferably carried out at below room temperature with external cooling being applied to maintain the internal temperature of the reaction mixture within the range of about 10° to 20° C. Any means of external cooling can be effectively utilized.

The concentration of the aqueous alkali solution which is employed in the saponification step is not particularly critical. However, sufficient quantity of water should be present in, or introduced into the system in the saponification step, to dissolve completely the water-soluble pantoyl lactone salt formed by the reaction. The saponification can be carried out employing an aqueous solution containing 5% to 20% by weight of alkali as the saponification agent. The preferred weight ratio is about 10% by weight of alkali saponification agent. Following the saponification step, 2-(1,1-dimethyl-2-hydroxy-ethyl)-5,5-dimethyl-1,3-dioxane can be isolated from the mixed solution system. The aqueous phase and the organic phase which comprise the two phase system can be separated by any convenient means. The aqueous phase contains the salt of pantoyl lactone, i.e., the sodium salt of alpha-gamma-dihydroxy-$\beta\beta$-dimethyl-butyric acid. This product can be worked up as disclosed in my co-pending application, Serial No. 711,814, filed January 29, 1958. The organic solvent phase contains 2-(1,1-dimethyl-2-hydroxyethyl)-5,5-dimethyl-1,3-dioxane. Complete evaporation of the organic solvent at the boiling point of the solvent will yield the desired product in crude form as a water-insoluble oily residue. Warm water washes of the water-insoluble product yield a water-insoluble amber colored oil. This oil can be spontaneously crystallized from the solution after dissolving in a suitable organic solvent, and allowed to stand overnight at room temperatures. Suitable organic solvents which can be used are hexane, pentane, or diethyl ether. Crystallization of the product can be effected from hexane and diethyl ether at about a temperature of 5° C. The product thus obtained, was in the form of long, white needles which melted at a temperature of 66.5° C. to 67.5° C. 50 g. of this material were then dissolved in 125 ml. of concentrated hydrochloric acid. Virtually all the material dissolved endothermically with little stirring indicating that there was oxonium formation. This indicates that this compound may be amenable to salt formation with $BF_3$. The unusual solubility of this compound in concentrated hydrochloric acid is a mere solubility effect, for dilution with $H_2O$ spontaneously reprecipitates the 2-(1,1-dimethyl-2-hydroxy-ethyl)-5,5-dimethyl-1,3-dioxane. The melting point of 2-(1,1-dimethyl-2-hydroxy-ethyl)-5,5-dimethyl - 1,3 - dioxane, has been reported as 65° C. to 66° C. in Berichte 76B, 949–956 (1943).

The crude pantoyl lactone from which 2-(1,1-dimethyl-2-hydroxy-ethyl)-5,5-dimethyl-1,3-dioxane is isolated in the practice of this invention is produced by the hydrolysis with acid, of formoisobutyraldol cyanohydrin. The latter compound can be prepared by any process which is based upon the condensation of isobutyraldehyde with formaldehyde in the presence of alkali cyanide. The precise manner in which the cyanohydrin compound is produced, or the procedure utilized in this hydrolysis, does not limit the practice of this invention.

In general, the methods set forth in my prior co-pending patent application referred to hereinbefore, can be employed in the preparation of 2-(1,1-dimethyl-2-hydroxy-ethyl)-5,5-dimethyl-1,3-dioxane, with due regard to the selection of raw material. That is, the crude pantoyl lactone from which 2-(1,1-dimethyl-2-hydroxy-ethyl)-5,5-dimethyl-1,3-dioxane is isolated in the practice of this invention can be produced by the hydrolysis with acid of formoisobutyraldol cyanohydrin. For a fuller understanding of the nature and objects of the invention, reference can be had to the following example which is given merely as a further illustration of the invention, and is not to be construed as a limitation. All parts given in the example are parts by weight unless otherwise indicated.

*Example*

A solution of 232.0 parts of sodium cyanide dissolved in 500.0 parts of water was carefully added to a solution of 395.0 parts of aqueous paraformaldehyde (36% to 37%), 350.0 parts of isobutyraldehyde (97% to 98%) and 168.0 parts of commercial methanol, the latter solution having been previously chilled to a temperature of −5° C. During the addition, the solution was continuously stirred and the internal temperature of the reaction mixture was maintained between about 12° C. to 20° C. It required about two hours for the addition of the reactants within the temperature limits. The mixture was stirred for an additional sixty minutes after the addition had been completed.

The solution of the cyanohydrin thus produced was thereafter poured into 1080 parts of 37% hydrochloric acid. The acid used had been previously cooled to a temperature of about 0° C. When the reactants were admixed, the temperature of the mixture rose to within the range of from about 50° C. to about 55° C. The mixture was then heated on a steam bath for about three hours.

At the end of that time, the solution was cooled to room temperature and adjusted to a pH 6.5 to 6.8 with about 78.0 parts of 28% aqueous ammonia. The lactone and the organic solvent impurities were extracted from the solution as follows: 825 parts of methylene chloride were added to the solution and stirred therewith. The methylene chloride solution was then separated from the aqueous phase. This procedure was repeated three times, using in each instance, 620 parts of methylene chloride. The aqueous reaction mixture was then extracted an additional time using 613 parts of methylene chloride. The methylene chloride extracts were then combined and stirred.

To these combined stirred extracts, 315.0 parts of 50% by weight of aqueous sodium hydroxide, and 738 parts of water were added slowly. The solution was maintained at an internal temperatture of from about 25° C. to about 32° C. by using an ice bath. The solution was stirred for a period of about thirty minutes after the addition was completed. Thereafter, the methylene chloride phase and the water phase were separated.

The desired 2-(1,1-dimethyl-2-hydroxy-ethyl)-5,5-dimethyl-1,3-dioxane was obtained as follows: The methylene chloride phase of the mixture was distillated at atmospheric pressure and finally distilled in vacuo to remove the last trace of solvent. An oily residue remained. This residue was washed 6 or 7 times using warm water (65–70°). Thereafter, the amber colored oily product was taken up in hexane at a reflux. The solution was then cooled to a temperature of 5° C. Crystallization of the product in the form of long, white needles occured. The product was air-dried at room temperature. Its melting point was determined to be 66.5° C. to 67.5° C. By a hydroxyl determination, the product was calculated to have a molecular weight of about 195, assuming the acetylation of a single hydroxyl group by the method of acetylation employed. Preparation of the p-nitrobenzoate derivative yielded a product having a melting point of 122° C. to 123° C. and a molecular weight, as determined by a saponification method, of 339. A Kjeldahl determination showed the absence of nitrogen in the parent compound; a carbon and hydrogen analysis gave $C=63.45$; $H=11.14$. When the neutral parent compound was refluxed with alcoholic potassium hydroxide, no alkali was consumed, indicating the absence of a lactone or ester function in the molecule. The parent compound, moreover, did not respond to a test for unsaturation with bromine in carbon tetrachloride; tests for the presence of an aldehyde or ketone function were also negative.

It is highly unexpected that a cyclic acetal compound such as 2-(1,1-dimethyl-2-hydroxy-ethyl)-5,5-dimethyl-1,3-dioxane is obtained as a by-product in the synthesis of pantoyl lactone (alpha-hydroxy-ββ-dimethyl-gamma-butyrolactone), since one would not expect the cyclic acetal to survive the vigorous acid conditions employed in the cyanohydrin hydrolysis step. From the foregoing, it may be seen that a new commercial practical process for obtaining and recovering 2-(1,1-dimethyl-2-hydroxy-ethyl)-5,5-dimethyl-1,3-dioxane has been made available.

Having described my invention, what I claim as new and desire to secure by Letters Patent is:

1. A process for producing 2-(1,1-dimethyl-2-hydroxy-ethyl)-5,5-dimethyl-1,3-dioxane from crude pantoyl lactone containing said dioxane which comprises first adjusting the pH of said crude lactone with an aqueous alkali solution to a pH of between about 6.5 to 6.8, then adding the resultant adjusted mixture to a water-immiscible organic solvent in which said pantoyl lactone is soluble and further adding an aqueous alkali solution to the water-immiscible organic solvent to form a two-phase system with the aqueous alkali solution, separating the water-immiscible organic solvent phase from the aqueous phase, and recovering the 2-(1,1-dimethyl-2-hydroxy-ethyl)-5,5-dimethyl-1,3-dioxane product from the organic phase.

2. A process for producing a 2-(1,1-dimethyl-2-hydroxy-ethyl)-5,5-dimethyl-1,3-dioxane from crude pantoyl lactone containing said dioxane, which comprises first adjusting the pH of said crude pantoyl lactone with an aqueous alkali solution to a pH of between about 6.5 to 6.8 further adding thereto a water-immiscible organic solvent to form a two-phase system with the aqueous alkali solution further saponifying said adjusted crude pantoyl lactone with an aqueous alkali solution, separating the water-immiscible organic solvent phase from the aqueous phase, and recovering the 2-(1,1-dimethyl-2-hydroxy-ethyl)-5,5-dimethyl-1,3-dioxane product from the organic phase.

3. The process of claim 2 wherein the aqueous alkali solution used is sodium hydroxide.

4. The process of claim 2 wherein said 2-(1,1-dimethyl-2-hydroxy-ethyl)-5,5-dimethyl-1,3-dioxane is recovered from said organic phase by evaporating off said solvent.

References Cited in the file of this patent

UNITED STATES PATENTS

| | | |
|---|---|---|
| 2,439,905 | Pickel et al. | Apr. 20, 1948 |
| 2,443,334 | Van House | June 15, 1948 |
| 2,852,530 | Ford | Sept. 16, 1958 |
| 2,863,878 | Lynn | Dec. 9, 1958 |